(12) United States Patent
Winters et al.

(10) Patent No.: US 7,156,891 B2
(45) Date of Patent: Jan. 2, 2007

(54) FORCED AIR SYSTEM AIR FILTER

(75) Inventors: Philip J. Winters, Lockport, IL (US);
Kevin Hobbs, Minooka, IL (US);
Michael Corbat, Naperville, IL (US);
Dean Kerstetter, Windsor, CA (US)

(73) Assignee: Filtration Group Incorporated, Joliet, IL (US)

(*) Notice: Subject to any disclaimer, the term of this patent is extended or adjusted under 35 U.S.C. 154(b) by 0 days.

(21) Appl. No.: 10/938,100

(22) Filed: Sep. 10, 2004

(65) Prior Publication Data

US 2006/0053759 A1    Mar. 16, 2006

(51) Int. Cl.
*B01D 46/00* (2006.01)
*B01D 46/52* (2006.01)

(52) U.S. Cl. .............. 55/497; 55/499; 55/500; 55/501; 55/503; 55/521; 55/528; 55/DIG. 5; 55/DIG. 31

(58) Field of Classification Search .............. 55/385.1, 55/495, 496, 497, 499, 500, 501, 503, 521, 55/527, 528, DIG. 5, DIG. 31; 156/60, 257
See application file for complete search history.

(56) References Cited

U.S. PATENT DOCUMENTS

| | | | |
|---|---|---|---|
| 30,782 A | | 11/1860 | Wright |
| 2,058,669 A | * | 10/1936 | Dollinger ............... 55/499 |
| 2,082,481 A | * | 6/1937 | Christofferson ........... 55/500 |
| 2,479,722 A | * | 8/1949 | Brixius ................... 55/499 |
| 2,681,155 A | * | 6/1954 | Graham .................. 55/500 |
| 2,864,460 A | * | 12/1958 | Powers ............... 55/DIG. 1 |
| 2,907,408 A | * | 10/1959 | Engle et al. ............... 55/500 |
| 3,144,315 A | * | 8/1964 | Hunn ..................... 55/521 |
| 3,177,637 A | * | 4/1965 | Davis .................... 55/497 |
| 3,344,590 A | | 10/1967 | Smith et al. |
| 3,392,846 A | | 7/1968 | Getzin |
| 3,620,375 A | * | 11/1971 | Atkins .................... 55/497 |
| 3,679,057 A | | 7/1972 | Perez |
| 3,712,033 A | | 1/1973 | Gronholz |
| 3,853,529 A | | 12/1974 | Boothe et al. |
| 3,941,571 A | | 3/1976 | Getzin |
| 3,999,964 A | * | 12/1976 | Carr ...................... 55/521 |
| 4,135,900 A | * | 1/1979 | Westlin et al. ............. 55/499 |
| 4,199,387 A | | 4/1980 | Hladik |

(Continued)

OTHER PUBLICATIONS

PerfectPleat PerfectPleat HC. Product Brochure [online]. AAF International, May 2003 [retrieved on Aug. 31, 2005]. Retrieved from the Internet: <URL: http://www.aafintl.com/eprsup/aaf_intl/brochures/PerfectPleat-PerfectPleatHC-AFP-1-200E.pdf>.*

*Primary Examiner*—Jason M. Greene
(74) *Attorney, Agent, or Firm*—Vedder Price Kaufman & Kammholz (57) ABSTRACT

An air filter including a filter media having a plurality of flat pleats defining a plurality of truncated pleat tips and sloping side surfaces along a front face and a rear face. The truncated pleat tips are oriented perpendicular to the direction of pleating and are configured with a planar tip portion. The reinforcement structure includes at least one generally planar first reinforcing strip oriented in the direction of the pleating and connected to the truncated pleat tips along the rear face. The reinforcing structure further includes at least one generally planar second reinforcing strip oriented in the direction of pleating and connected to the truncate pleat tips along the front face.

118 Claims, 8 Drawing Sheets

U.S. PATENT DOCUMENTS

| | | | |
|---|---|---|---|
| 4,210,067 A | | 7/1980 | Evans, Jr. |
| 4,615,804 A | * | 10/1986 | Wright ........................ 55/521 |
| 4,678,578 A | | 7/1987 | Nodes |
| 4,731,047 A | | 3/1988 | Lobb |
| 4,798,575 A | | 1/1989 | Siversson |
| 4,817,942 A | | 4/1989 | Begon |
| 4,976,677 A | | 12/1990 | Siversson |
| 5,143,604 A | * | 9/1992 | Bernard et al. ........ 55/DIG. 31 |
| 5,230,800 A | | 7/1993 | Nelson |
| 5,389,175 A | | 2/1995 | Wenz |
| 5,391,212 A | * | 2/1995 | Ernst et al. ................... 55/497 |
| 5,397,632 A | | 3/1995 | Murphy, Jr. et al. |
| 5,505,852 A | | 4/1996 | Van Rossen |
| 5,507,847 A | | 4/1996 | George |
| 5,509,950 A | | 4/1996 | van de Graff et al. |
| 5,512,075 A | | 4/1996 | Ninomiya |
| 5,597,645 A | | 1/1997 | Pike et al. |
| 5,618,324 A | | 4/1997 | Sommer et al. |
| 5,620,505 A | * | 4/1997 | Koch et al. ................... 55/497 |
| 5,704,953 A | | 1/1998 | Stemmer |
| 5,709,735 A | | 1/1998 | Midkiff et al. |
| 5,779,747 A | | 7/1998 | Schlor |
| 5,810,898 A | * | 9/1998 | Miller ......................... 55/501 |
| 5,814,219 A | | 9/1998 | Friedmann |
| 5,820,644 A | | 10/1998 | Mori et al. |
| 5,836,861 A | | 11/1998 | Diaz |
| 5,868,889 A | | 2/1999 | Kahler |
| 6,039,779 A | | 3/2000 | Butz et al. |
| 6,045,597 A | * | 4/2000 | Choi .......................... 55/497 |
| 6,074,450 A | * | 6/2000 | Raber ......................... 55/497 |
| 6,152,980 A | | 11/2000 | Culwell |
| 6,159,318 A | * | 12/2000 | Choi .......................... 156/167 |
| 6,254,653 B1 | * | 7/2001 | Choi et al. ................... 55/497 |
| 6,299,660 B1 | | 10/2001 | Pfeuffer et al. |
| 6,319,300 B1 | | 11/2001 | Chen |
| 6,398,839 B1 | * | 6/2002 | Choi et al. ................... 55/499 |
| 6,464,745 B1 | * | 10/2002 | Rivera et al. ................. 55/497 |
| 6,507,717 B1 | * | 1/2003 | Kushida ....................... 55/497 |
| 6,740,136 B1 | | 5/2004 | Duffy |
| 6,740,137 B1 | | 5/2004 | Kuboawa et al. |
| 6,843,820 B1 | * | 1/2005 | Kubokawa .................... 55/495 |
| 2004/0112023 A1 | * | 6/2004 | Choi .......................... 55/521 |

\* cited by examiner

FORCED AIR SYSTEM AIR FILTER

BACKGROUND

The present disclosure relates to an air filter for forced air heating, ventilating and/or air conditioning ("HVAC") systems. More specifically, the present disclosure relates to an air filter having a plurality of flat pleats which facilitates better bonding with a reinforcing structure and strengthens the filter media such that the surface area of the filter media is greater and the pressure drop of the air moving through the air filter is lower than conventional air filters.

Pleated paper filter elements of the type used in forced air systems require replacement when filter surfaces become so covered by dust and dirt particles that they clog the paper filter, that they restrict air flow. For a required air flow rate and filtration, the useful life of the filter or the time between cleaning depends on its surface area. Thus, to increase the useful life of a filter element, the surface areas typically increase.

One method to increase filter surface area is to increase the size the of the pleated filter, the depth of the pleats or the pleat density. In many HVAC systems, the height and width dimensions of a pleated filter usually cannot be increased due to physical constraints of the forced air system. Accordingly, reasonable methods to increase the surface area are limited to increasing the depth of the pleats and the pleat density. However, the surface area of the filter media is also a major factor in determining flow resistance (i.e., pressure drop) and loading capacity of the pleated filter.

The ability of an air filter media to withstand operating pressures is typically dependent upon the pleat count, the pleat depth and the stiffness of the filter media. The filter media can become unsteady when air pressure is applied to one side. In the event the pleats deform or collapse, a portion of the surface area can be reduced and the pressure drop or across filter element will increase, further increasing the force applied to the filter media.

For example, in one prior art design an accordion folded filter element includes planar reinforcing strips bonded to pleat tips by an adhesive. Another prior art design utilizes a glue bead applied prior to folding of the filter media which connects the folds with one another at the point of application. Yet another prior art design spaces the folds of the pleated filter media using a tapered assembly comb having uniformly spaced teeth. Still another prior art design utilizes a truss-type of reinforcing structure.

Therefore, there is a need for an air filter that provides more filter filter media area, reduces pressure drop, provides better bonding between the filter media and a reinforcing structure, has more uniform pleats, aids in the processing of the filter media and decreases material and manufacturing costs.

BRIEF DESCRIPTION OF THE DRAWINGS

Certain embodiments are shown in the drawings. However, it is understood that the present disclosure is not limited to the arrangements and instrumentalities shown in the attached drawings, wherein.

DETAILED DESCRIPTION

For the purposes of promoting an understanding of the principles disclosed herein, reference will now be made to the preferred embodiments illustrated in the drawings and specific language will be used to describe the same. It will nevertheless be understood that no limitation of the scope is thereby intended, such alterations and further modifications in the illustrated apparatus or assembly thereof, and such further applications of the principles disclosed as illustrated therein being contemplated as would normally occur to one skilled in the art to which this disclosure relates.

In one aspect of the present invention, an air filter includes a filter media having a plurality of flat pleats defining a plurality of truncated pleat tips and sloping sides surfaces along a front face and a rear face of the filter. The truncated pleat tips are oriented perpendicular to the direction of pleading and are configured with a planar tip portion. A reinforcing structure includes at least one generally planar first reinforcing strip oriented in the direction of pleating and connected to the truncated pleat tips along the rear face. The reinforcing structure further includes at one generally planar second reinforcing strip oriented in the direction of pleating and connected to the truncated pleat tips along the front face.

In another aspect of the present invention, an air filter includes a filter media having a plurality of flat pleats defining a plurality of truncated pleat tips and sloping sides surfaces along a front face and a rear face of the filter media. The truncated pleat tips are oriented perpendicular to the direction of pleating and are configured for the planar tip portion. A reinforcing structure includes at least one reinforcing number oriented perpendicular to the direction of pleading. Each such reinforcing member has a first planar element extending along one sloping side surface of the rear face from a first edge to a second edge adjacent to a rear face. The reinforcing structure further includes at least one generally planar first reinforcing strip oriented in the direction of pleating and connected to the truncated pleat tips along the rear face and the reinforcing member.

In another aspect of the present invention, an air filter includes a filter media having a plurality of flat pleats defining a plurality of truncated pleat tips and sloping side surfaces along a front face and a rear face. The truncated pleat tips are oriented perpendicular to the direction of the pleating and are configured with a planar tip portion defined by a pair of offset score lines formed in the filter media as opposing longitude of the edges of the planar tip portion. In one embodiment, the offset score lines were spaced apart from each other by a distance of approximately 0.03125 inches. The distance between the pairs of score lines will be determined by the desired pleat depth.

A reinforcing structure includes at least one reinforcing member oriented perpendicular to the direction of the pleating. Each such reinforcing member has a first planar element extending along one sloping side surface other face from a first edge to second edge adjacent the rear face. The reinforcing structure further includes at least one generally first planar reinforcing strip oriented in the direction of the pleating and connected to the planar tip portions along the rear face and each reinforcing member. The reinforcing structure still further includes at least one generally second planar reinforcing strip oriented in the direction of pleating and connected to the planar tip portions along the front face.

Figure 1:
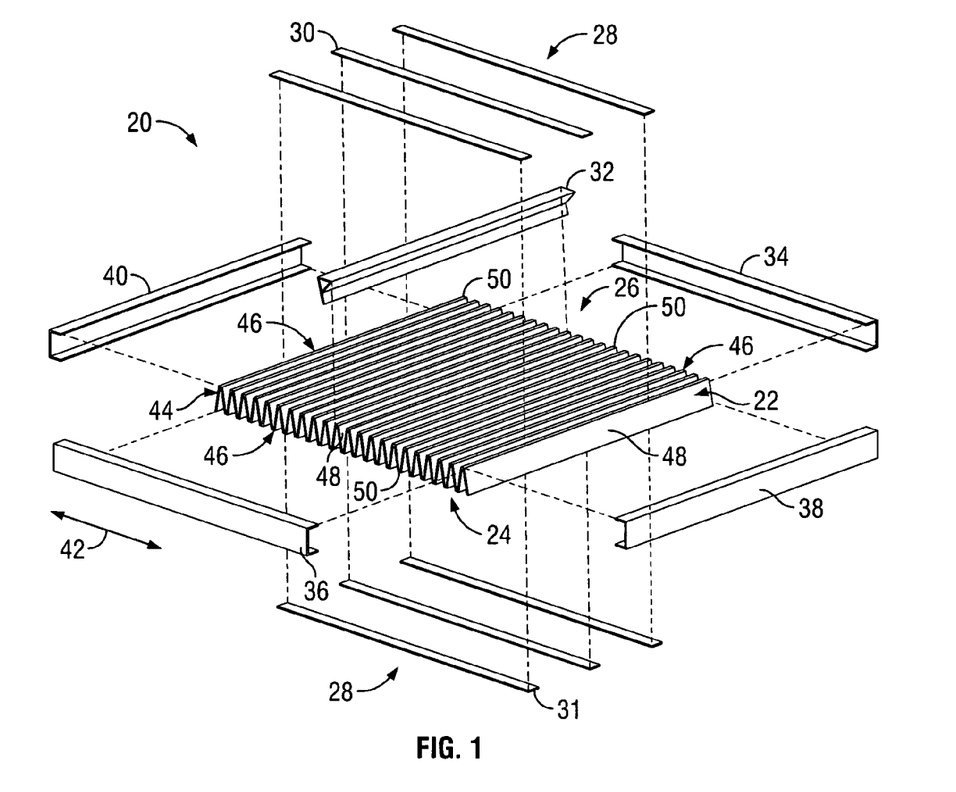
FIG. 1 is an exploded view of an air filter.

FIG. 1 is an exploded view of an air filter 20 that includes a filter media element 22 having a plurality of "fan-folded" or "accordian folded" a flat pleats 44. Each fold or pleat is defined by a section of two-sided or planar filter media that is folded. Each fold defines a truncated pleat tip 46 between adjacent sloping side surfaces 48 along a front face 24 (shown in cross-section in FIGS. 2B, 3B and 4B) and a rear face 26 (shown in cross section in FIGS. 2A, 3A and 4A). The truncated pleat tips 46 are oriented perpendicular to the direction of pleating (as indicated by the double-headed arrow 42). Each pleat tip has a planar tip portion 50, described in detail below.

The air filter 20 preferably includes a plurality of frame members that support the media element 22. The frame members include opposing side frame members 34, 36 and opposing end frame members 38, 40. As shown in FIG. 1, the side frame members and the end frame members are orthogonal to each other. The filter media 22 is connected to the frame members 34, 36, 38, 40 in any conventional manner to provide a leak-proof seal there between. The air filter 20 can also include one or more planar reinforcing strips 28 on both the top and bottom surfaces of the filter 20. The "top" reinforcing strip is identified by reference numeral 30 whereas the bottom reinforcing strip is identified by reference numeral 31. Those of ordinary skill in the art will recognize that the planar reinforcing strips 30 do not need to be planar and that other cross-sectional shapes could also be used. Square, circular, L-shaped or rectangular cross sections should all be considered equivalent embodiments. For claim construction purposes, the term "planar reinforcing strip" and "reinforcing strip" should be construed to include at least all of the above-identified geometries.

The filter 20 also includes one or more reinforcing members 32, first reinforcing strip 30 or second reinforcing strip 31. Each reinforcing member 32 is oriented perpendicular to the direction of pleating 42. Each planar first reinforcing strip 30 is oriented in the direction of pleating 42 and abuts the planar tip portions 50 along the rear face 26 and each reinforcing member 32. Each planar second reinforcing strip 31 is oriented in the direction of pleating 42 and is connected to the planar tip portions 50 along the front face 24. Preferably, the first and second reinforcing strips 30, 31 extend over and are connected to opposing end frame sections 38, 40 to provide additional support, as shown in FIG. 2.

Those of ordinary skill in the art will recognize that the frame members, the planar reinforcing strips and the pleat-conforming member can each be made out of metal or plastic as needed by the application in which the filter 20 is to be used.

Figure 2A:
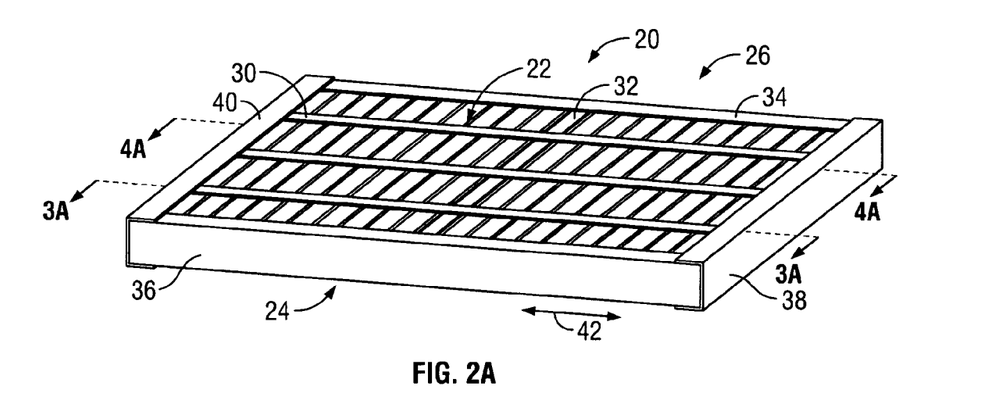
FIG. 2A is a perspective view of the rear face of the air filter of FIG. 1.

FIG. 2A is a perspective view of the rear face 26 of the air filter 20 assembled in accordance with FIG. 1. The filter media 22 is disposed within a volume defined by the aforementioned frame members 34, 36, 38, 40 and provided with an airtight seal so that when the filter 20 is installed into an air stream, the applied air stream passes through the air filter 20 instead of around it. The reinforcing member 32 is located to align with and fit snugly within one of the flat pleats along the rear face 26, thereby providing support for the filter media 22. As the terms are used herein, an air stream that impinged on the front face 24, passes through the media 22 from the front face 24 and exits the filter 22 from the rear face 26.

Figure 2B:
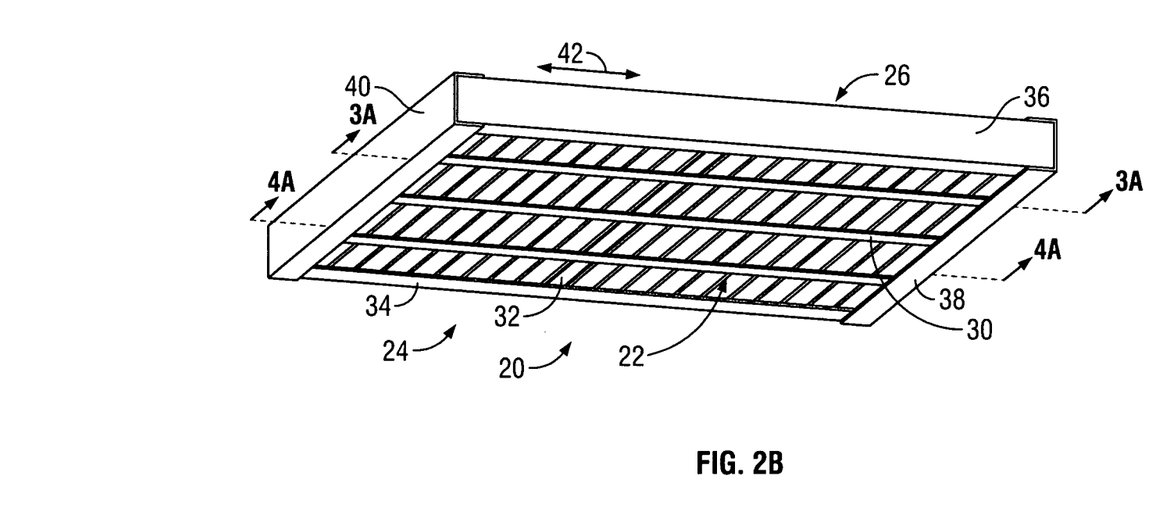
FIG. 2B is a perspective view of the front face of the air filter of FIG. 1.

FIG. 2B is a perspective view of the front face 24 of an alternative embodiment of the air filter 20 wherein the reinforcing member 32 is located to align with and fit snugly within one of the flat pleats along the front face 24, thereby providing support for the filter media 22.

The first reinforcing strips 30, which are connected to the planar tip portions 50, are preferably attached to the planar tip portion 50 of each of the truncated pleat tips 46 along the rear face 26 and/or front face 24 by an appropriate adhesive or a mechanical connector.

The opposing distal ends of the first reinforcing strips 30 are also connected to surfaces of the end frame sections 38, 40. It will be recognized by those of skill in the art that the first reinforcing strips 30 extend in the direction of pleating 42.

Figure 3A:
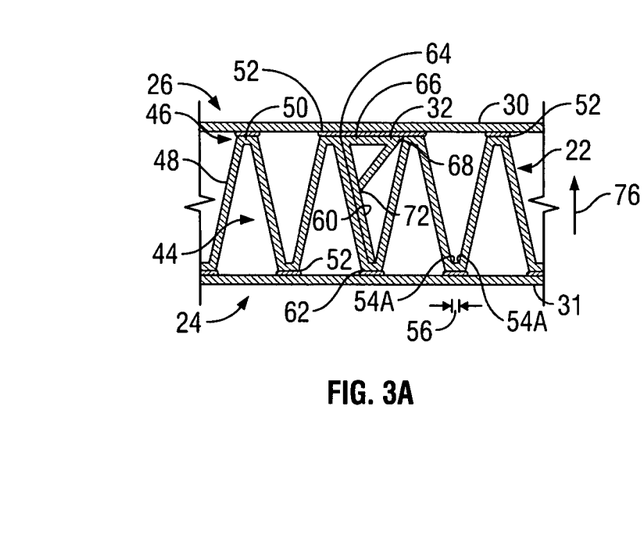
FIG. 3A is a partial section view of the air filter of FIG. 2A taken along line 3A—3A.
Figure 3B:
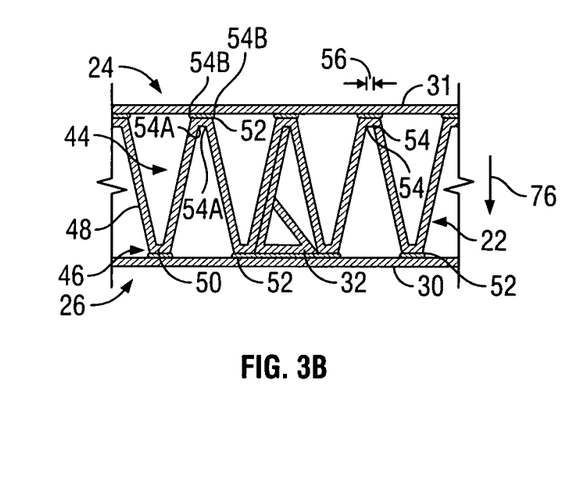
FIG. 3B is a partial section view of the air filter of FIG. 2B taken along line 3B—3B.

FIG. 3A is a partial section view of the air filter 20 of FIG. 2A taken along line 3A—3A and more clearly illustrates the configuration of the filter media 22, first and second reinforcing strips 30, 31 and the reinforcing member 32. Likewise, FIG. 3B is a partial section view of the air filter 20 of FIG. 2B taken along line 3B—3B and more clearly illustrates the configuration of the filter media 22, first and second reinforcing strips 30, 31 and the reinforcing member 32 in this embodiment. It will be recognized by those of skill in the art that the two embodiments of FIGS. 3A and 3B are similar and accordingly, will be discussed simultaneously. The filter media 22 may be constructed of any material to provide the desired filtration characteristics of an intended application. One such construction may include a composition of one hundred percent (100%) low melt fibers. It will be recognized by those of skill in the art that various different filter media structural compositions may be successfully used in connection with the present invention because of the aforementioned advantages, namely, lower pressure drop, increased amount of media, more uniformed pleats, etc.

As set forth above, the filter media 22 has a plurality of pleats 44, each pleat having a pleat tip 46 between the sloping side surfaces 48 the shape of which is reminiscent of an accordion bellows. A planar tip portion 46 is defined by folding the media 22 at each of two score lines 54 that are scored, cut or otherwise formed in the filter media 22. The score lines 54 may be depressions or compressions of the media 22, or cuts or slices in the media 22 that do not extend completely through the media 22. By folding the media twice, i.e., at both score lines, a substantially flat or planar tip portion 46 is formed in the filter media to aid in forming a crisp fold and a planar pleat tip 46. The score lines 54 are off-set by a dimension represented by the arrow 56. It will be recognized by those of skill in the art that the dimension 56 may be adjusted and/or varied according to the needs of a particular application to provide planar tip portions 50 of different widths. It will be further recognized that the dimension 56 may be different for the pleats on the front face in comparison to the pleats on the rear face.

The planar tip portion 50 provides a flat area on which an adhesive 52 can be applied. Applying an adhesive to a flat or planar tip portion 50 is much easier than applying an adhesive to a narrow, pointed peak that would result if the filter media were folded once instead of at both score lines 56. Accordingly, manufacturability is greatly eased because less precision is required to place the adhesive 52 atop the planar tip portion 50 of the flat pleats 44 of the present invention.

By bonding, gluing or otherwise affixing the planar tip portions 46 to the reinforcing strips, the filter media 22 is provided with an increased bending strength. Each second reinforcing strip 31 is connected with and preferably bonded to, the planar tip portion 50 of the truncated pleat tips 46, along the front face 24. The adhesive 52 which is used to connect the second reinforcing strip 31 to the planar tip portion 50 along the front face 24 and the first reinforcing strip 30 to the planar tip portion along the rear face and the pleat-conforming reinforcing member 32 may be an adhesive which connects the aforementioned parts together. Adhesives that are suitable for use in an HVAC system and which can bond the media to the reinforcing strips are known in the art.

Figure 4A:
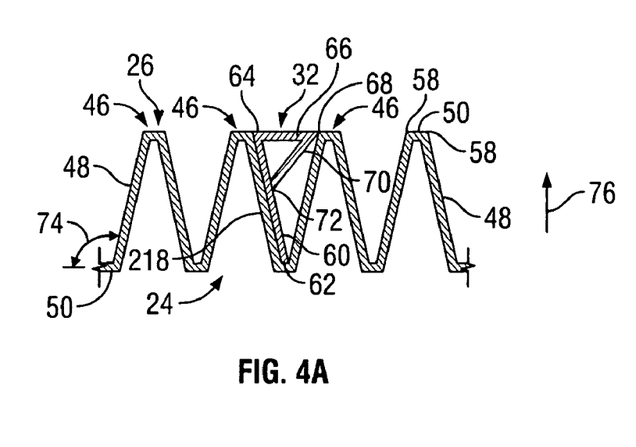
FIG. 4A is a partial section view of the air filter of FIG. 2A taken along line 4A—4A.
Figure 4B:
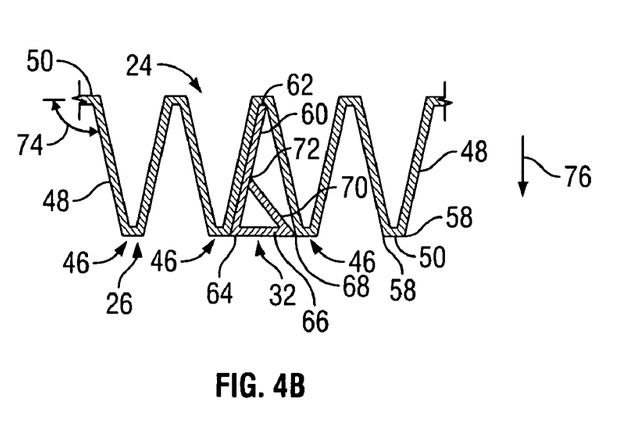
FIG. 4B is a partial section view of the air filter of FIG. 2B taken along line 4B—4B.

FIG. 4A is a partial section view of the air filter of FIG. 2A taken along line 4A—4A that more clearly illustrates the filter media 22 and reinforcing member 32 without the reinforcing strips 30, 31. Likewise, FIG. 4B is a partial section view of the air filter of FIG. 2B taken along line 4B—4B that more clearly illustrates the filter media 22 and reinforcing member 32 without the reinforcing strips 30, 31. It will be recognized by those of skill in the art that the two embodiments of FIGS. 4A and 4B are similar and accordingly, will be discussed simultaneously. The planar tip portions 46 and the inclined surface 48 of a filter media pleat are inclined with respect to each other. The exterior angle formed between these two surfaces is at an angle that is more than ninety degrees. Conversely, the interior angle between these two surfaces is less than ninety degrees. Increasing the exterior angle 74 (decreasing the interior angle) will decrease the number of pleats that can be folded into a given space and decreasing the filter media 22 surface area in a filter 20 of a given height and width. Decreasing the exterior angle 74 toward ninety degrees will increase the number of pleats and as a result, the filter media surface area in a filter 20 of a given height and width. It should be apparent to those of ordinary skill in the art that in one embodiment the distance between adjacent truncated pleat tips across the front or rear face is substantially the same. In an alternative embodiment, the distances between adjacent truncated pleat tips can be varied. For example, pleat tips next to one end of the frame might be very close to each other but with the distance between successively adjacent pleat tips gradually increasing as the distance from the one end of the frame increases.

FIGS. 3A, 3B, 4A and 4B show an end-view of one embodiment of the reinforcing member 32 that includes a first inclined planar element 60 which extends along one sloping side surface 48 of the rear face 26 from a first edge 62 to a second edge 64 adjacent the rear face 26. The reinforcing member 32 may also further include a second planar element 66 extending from the second edge 64 to a third edge 68 between adjacent truncated pleat tips 46. The reinforcing member may further still include a third planar element 70 which extends from the third edge 68 to a fourth edge 72 which is contiguous with the first planar element 60 between the first and second edges 62, 64. The reinforcing member 32 may be connected to the filter media when disposed within one of the flat pleats 44 along the rear face 26 and/or front face 24 either along a face of the first planar element 60 which is contiguous with one of the sloping slide surfaces 48, at the first edge 62, second edge 64 or third edge 68. It will be recognized by those of skill in the art that the reinforcing member 32 is not required to be connected to the filter media 22 in order to perform the intended function. The reinforcing member 32 may be formed from a single sheet of material which is folded into the preferred configuration or may be formed from a plurality of pieces. In one embodiment, the fourth edge bisects the first planar element.

Figure 3C:
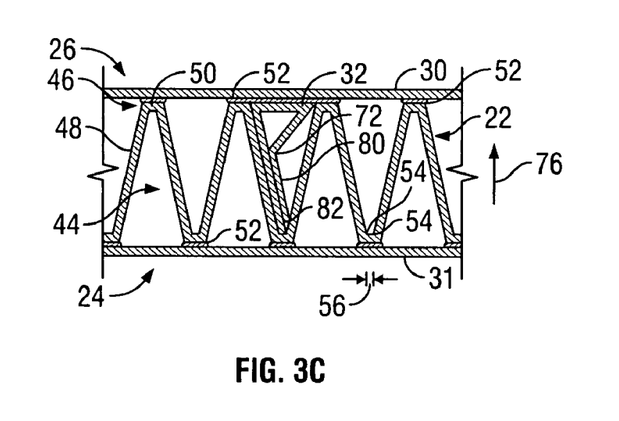
FIG. 3C is a partial section view of the air filter of FIGS. 3A and 3B showing an alternative reinforcing member.
Figure 4C:
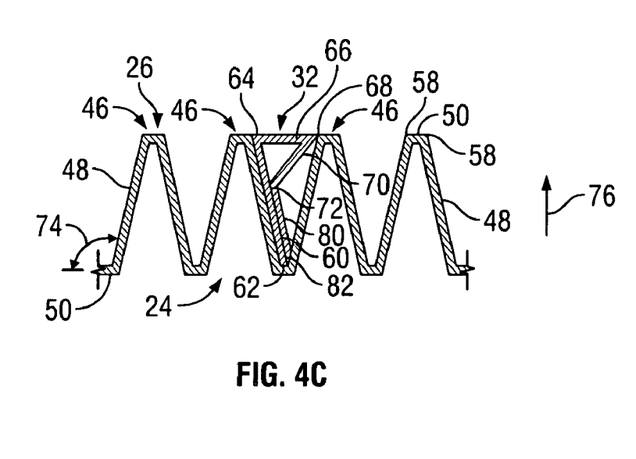
FIG. 4C is a partial section view of the air filter of FIGS. 4A and 4B showing an alternative reinforcing member.

FIGS. 3C and 4C are partial section views of the air filter of FIGS. 3A and 3B and FIGS. 4A and 4B, respectively, showing an alternative reinforcing member 32 similar to the reinforcing member described above with respect to FIGS. 3A, 3B, 4A and 4B. However, this embodiment of the reinforcing member 32 includes a fourth planar element 80 that extends from the fourth edge 72 to a fifth edge 82. The fourth planar element 80 is preferably parallel to and contiguous with a portion of the first planar element 60. It will be recognized by those of skill in the art that the fourth planar element 80 is not required to be connected to the first planar element 60 in order to perform the intended function.

Figure 5A:
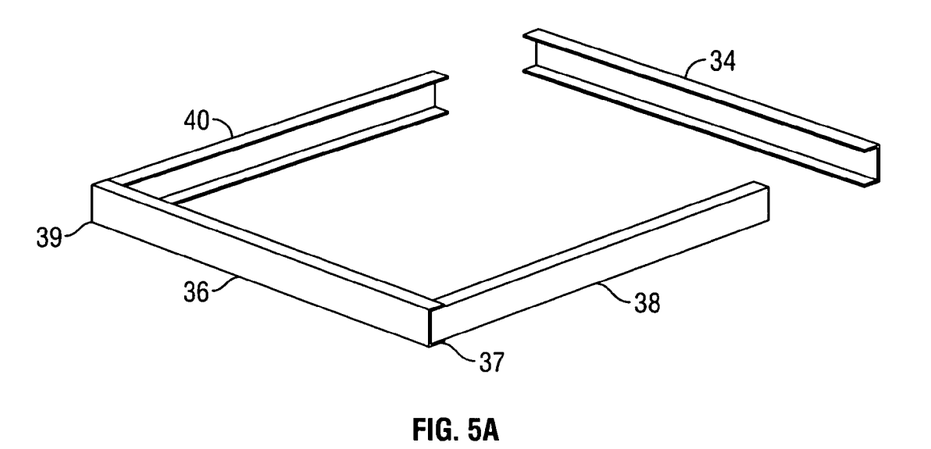
FIGS. 5A, 5B and 5C are perspective views of alternative frames.
Figure 5B:
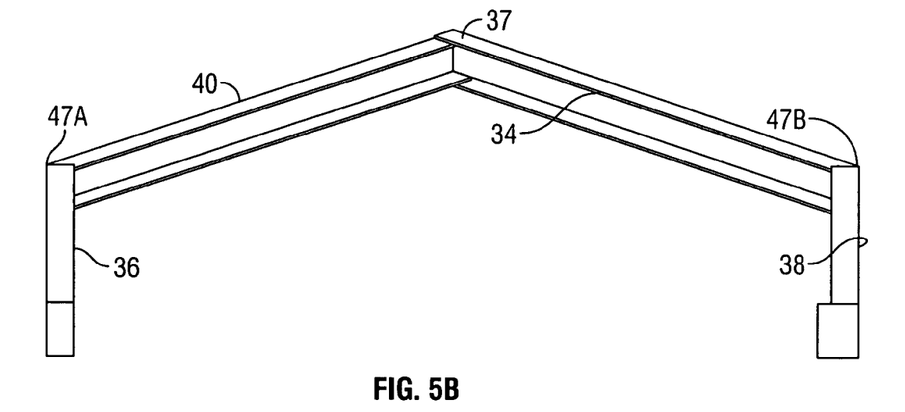
Figure 5C:
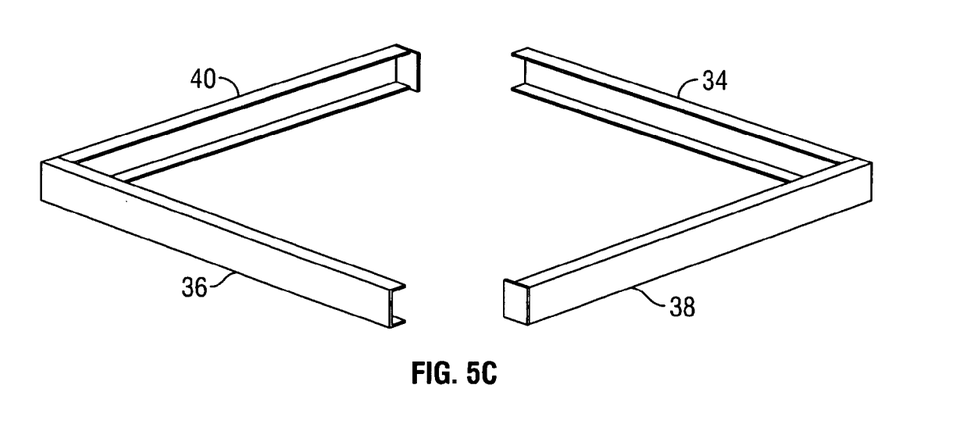

FIGS. 5A, 5B, and 5C are each a perspective view of other embodiments of the frame members 34, 36, 38, 40. As shown in FIG. 5A, frame members 36, 38 and 40 can be formed from a single U-shaped channel, bent to form two corners. In particular, frame members 36 is bounded by two corners 37 and 39 from which the other two frame members 38 and 40 extend. The extension of the members 38 and 40 from the first section 36 is itself a U-shaped structure, which is formed from U-shaped channel. A fourth frame members 34 is removably attached to the other three members 36, 38 and 40, such as by way of adhesive or mechanical fastener such as screws or pins or the like.

In FIG. 5B, a first frame member 40 is bounded at one end by a corner 37 as shown. Frame member 34 extends from the corner 37, substantially orthogonal to the first frame member 40. The two frame members 34 and 40 form an "L"-shaped frame by the frame members 34 and 40 being fixedly attached to each other at the corner 37. The other two frame members 36 and 38 are hinged however, to open and close the frame into which a filter media is installed.

Members 36 and 38 are each hingedly attached to the frame members 40 and 34 respectively so that they can independently "open" and "close." A first hinge 47A between frame members 36 and 40 allow them to close. A second hinge 47B between frame members 34 and 38 also allow them to close. Closing members 36 and 38 using the two hinges 47A and 47B allows the four members 34, 36, 38 and 40 to form the frame for the filter media.

In FIG. 5C, two half-frame members (34/38 and 36/40) can be removably attached to each other to form a closed frame. Each of the two half-frames are joined together using adhesive or mechanical fastener such as screws or pins or the like. Both of the two half-sections can be joined together to form the frame shown in FIG. 1.

Figure 6A:
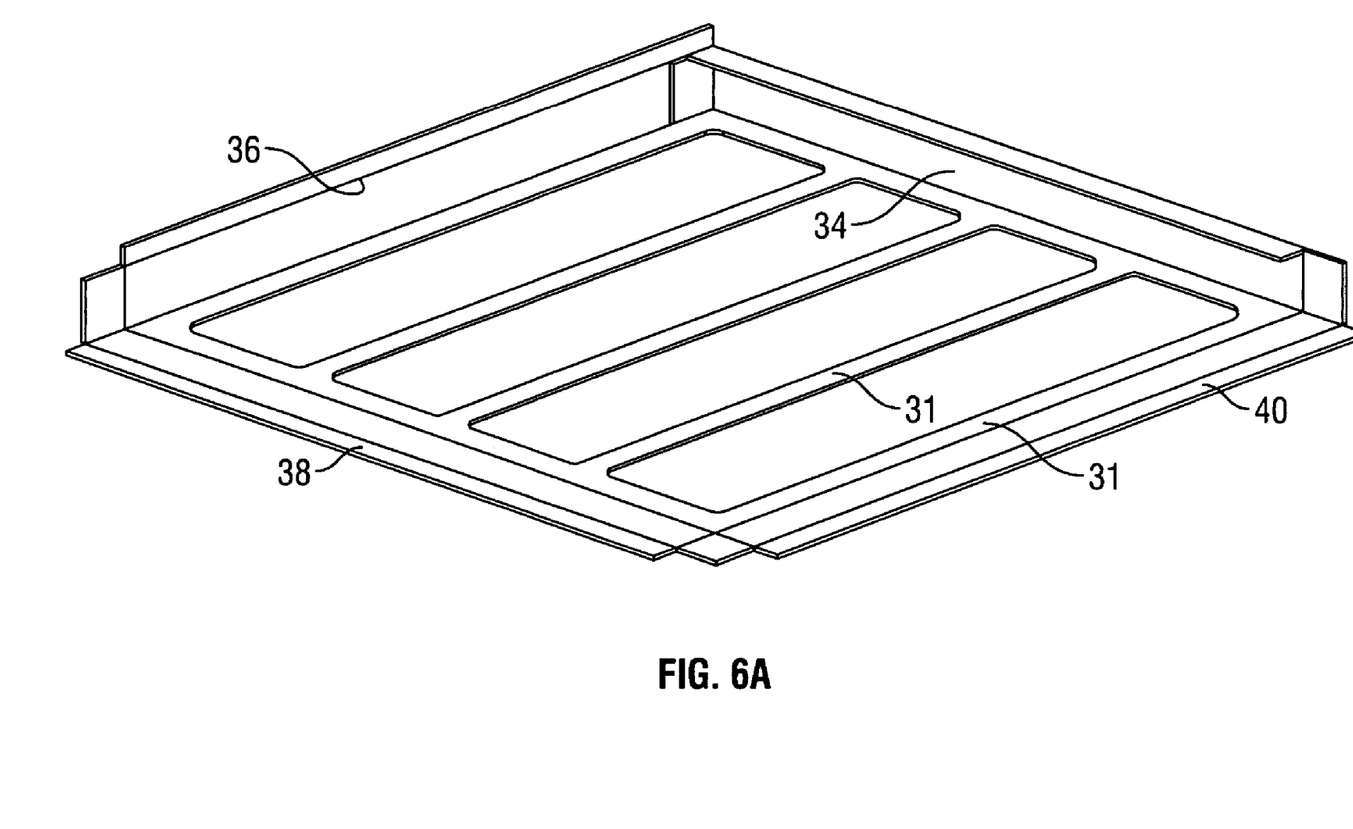
FIGS. 6A, 6B and 6C are perspective views of further alternative frames.
Figure 6B:
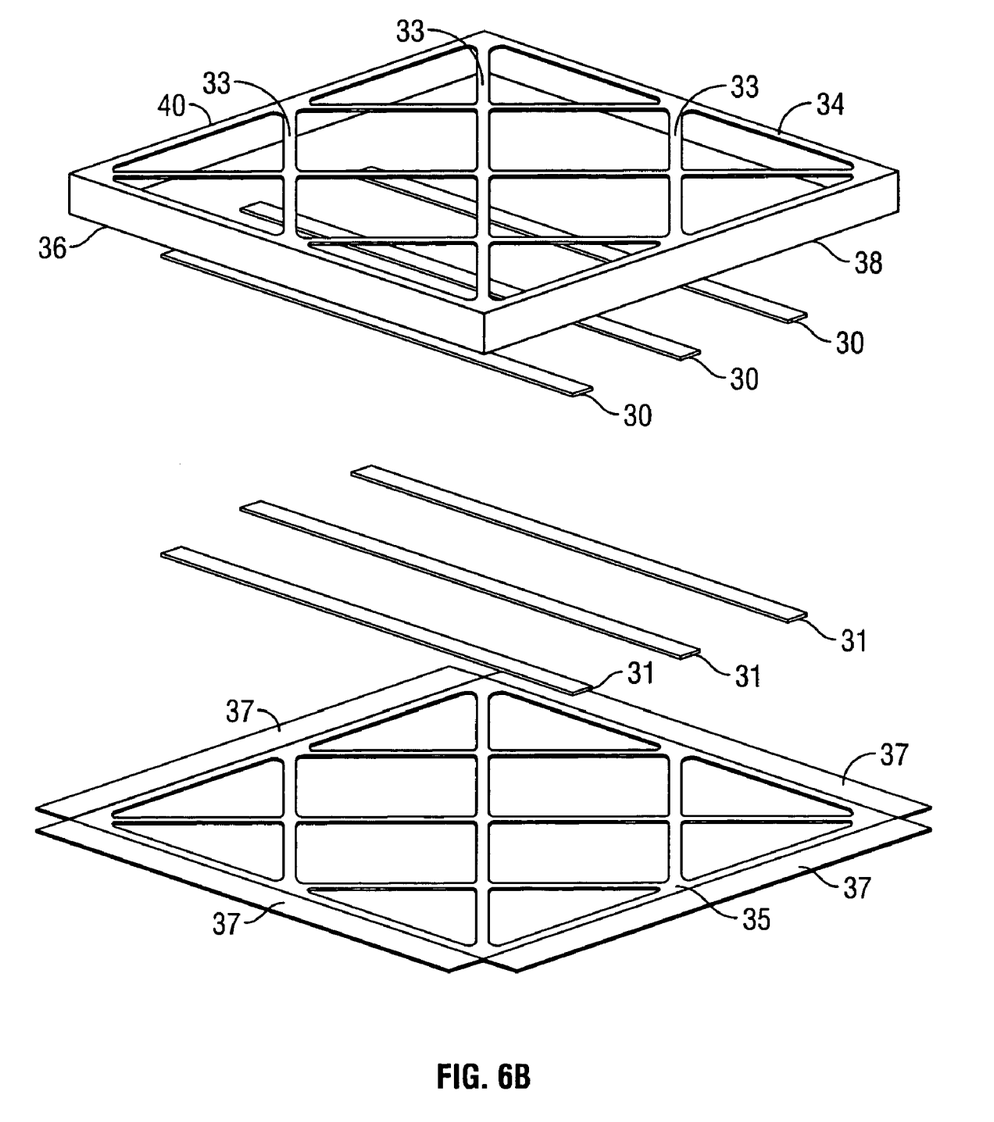

FIGS. 6A and 6B show yet two other embodiments of the filter frame. FIG. 6A shows an alternate embodiment of the frame wherein the aforementioned planar reinforcing strips 30 and 31 are integrally formed with the frame members. Note that in FIG. 6A, there are no seams between the planar reinforcing strips and the frame members 38 and 40. The planar reinforcing strips are instead formed as part of the frame member 38. Integrally-formed planar reinforcing strips 31 simplify the filter 20 assembly by eliminating placement and attachment of the planar reinforcing strips.

FIG. 6B shows yet another alternate embodiment. In FIG. 6B, the first and second reinforcing strips 30 and 31 are located just outside the filter media (not shown in FIG. 6B but just inside cross-braced frames 33 and 35. The upper cross-braced frame 33 is formed with (or "include") the opposing frame members 34, 36, 38 and 40. The upper cross bracing frame 33 keeps the opposing frame members square, i.e., at right angles to each other.

The lower cross-bracing frame 35 includes mounting flanges 37. Adhesive or mechanical fasteners (not shown) attach the lower cross bracing frame 35 to the opposing frame member 34, 36, 38 and 40 and add additional structural rigidity to the filter 20.

Figure 6C:
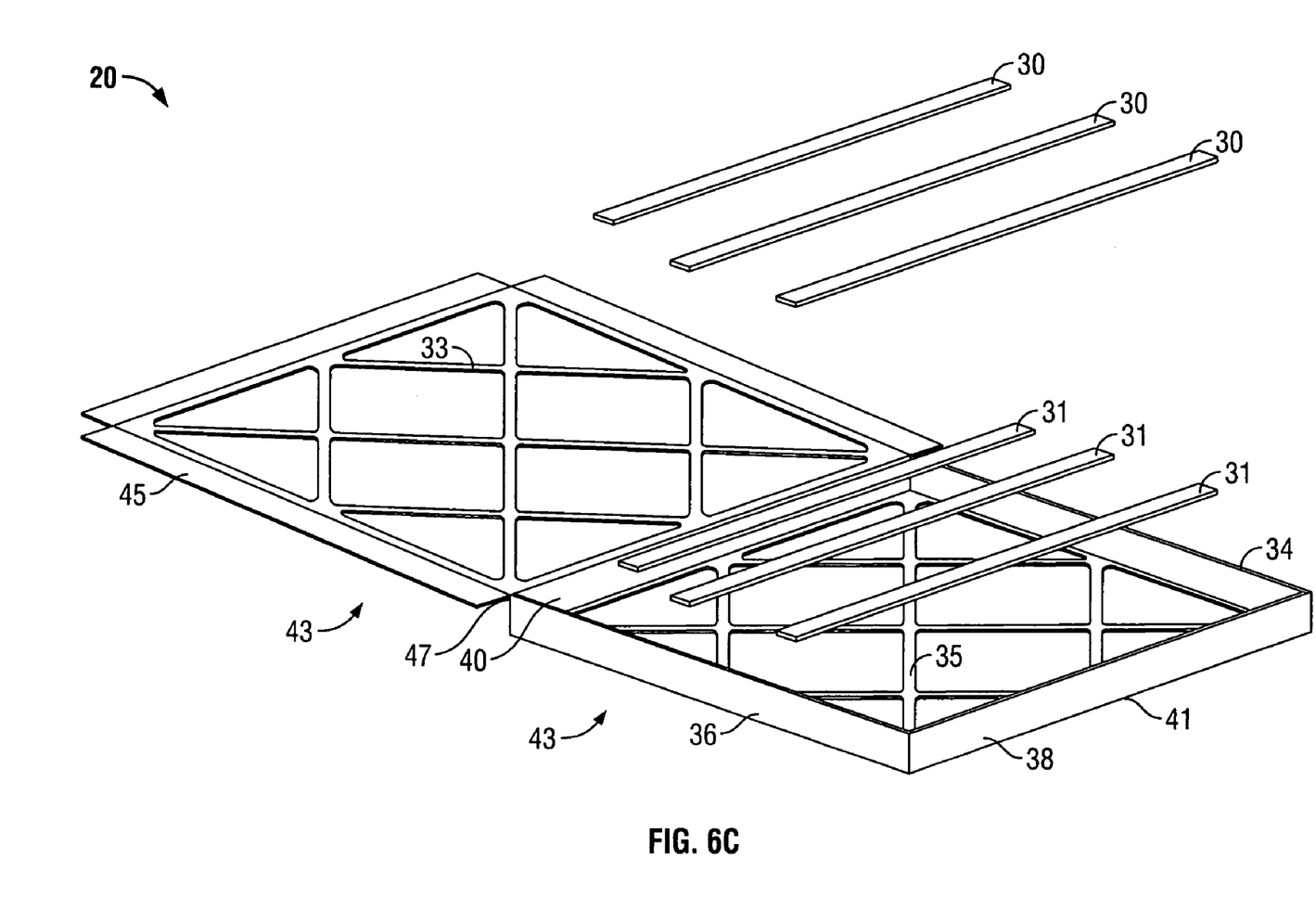

FIG. 6C shows yet another alternate embodiment of the filter 20. In FIG. 6C, the frame members 34, 36, 38 and 40 are attached to each other by adhesive or mechanical fastener or the like and form a lower or bottom half 41 of a frame 43 for the filter 20. Cross bracing 35 keeps the frame members 34, 36, 38 and 40 of the bottom half 41 square. Optional planar reinforcing strips in the bottom half 41 help keep the filter media (not shown) flat.

The filter 20 shown in FIG. 6C has an upper half 45 that includes its own cross bracing 33. Like the bottom half 41, the upper half 45 accepts optional planar reinforcing strips 30 to keep filter media flat. Like the bottom half cross bracing 35, the upper half cross bracing 33 keeps the upper half 45 square as it's opened and closed by way of a hinge 47 that runs along (or is attached to) one frame member 40 of the bottom half 41 and a corresponding edge of the upper half 45. The hinge 47 allows the upper half 45 and lower half 47 to be opened and closed to ease replacement of filter media (not shown).

Figure 7A:
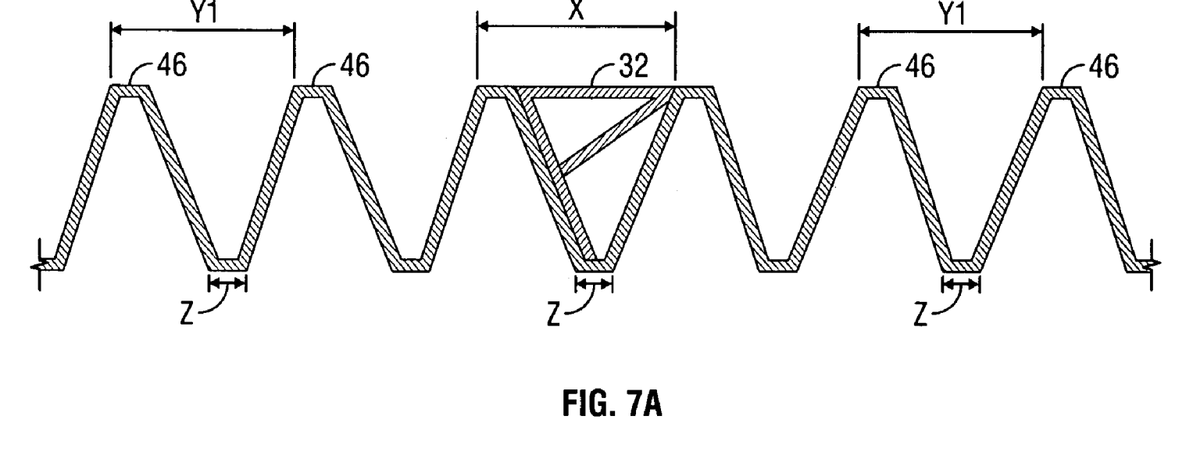
FIGS. 7A and 7B are partial section views of air filter pleat spacing.
Figure 7B:
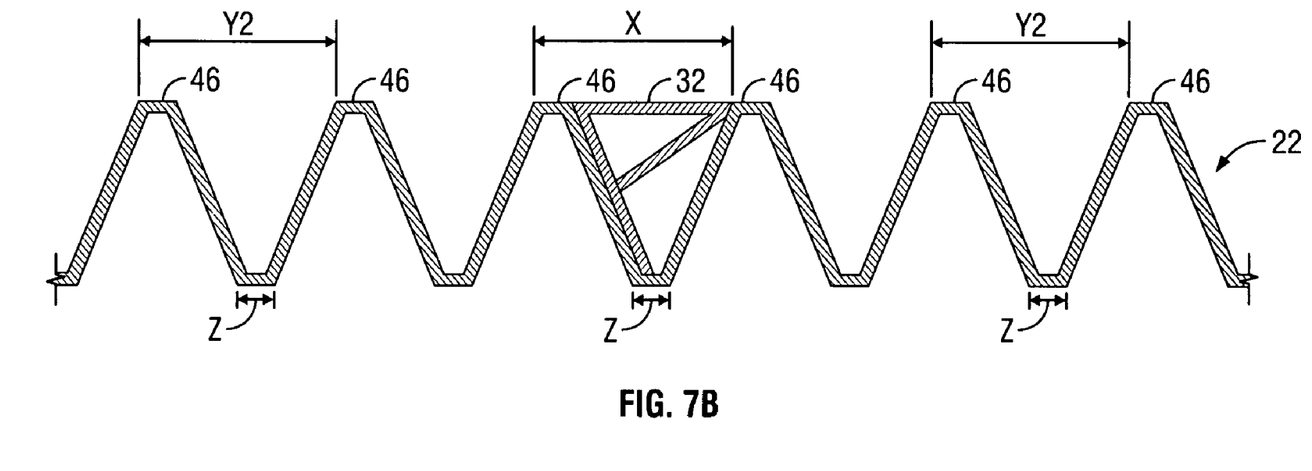

Finally, FIGS. 7A and 7B show how the filter media 22 of the filter 20 may be configured to have a fixed as well as a variable "frequency." As shown in FIG. 7A, successive truncated pleat tips 46 have a regular and periodic spacing Y1 between them across the width of the media, including the location X of the reinforcing member 32. As is well-known, such a generally saw-tooth like wave has a "wavelength" equal to the spacing between pleat tips 46 and "frequency" that is inversely proportional to the wavelength. For purposes of claim construction, filter pleats have a "frequency" that corresponds to the spacing between them. The pleat "frequency" is considered fixed when the spacing between pleats Y1 and X is uniform. Pleat "frequency" is considered to be variable when the pleat spacing is not uniform but instead varies.

FIG. 7B illustrates the filter media 22 with a variable pleat frequency. The successive truncated pleat tips 46 on either side of the reinforcing member 32 have a regular and periodic spacing Y2 (i.e., the wavelength and hence the inverse of the pleat frequency) which is larger or greater than the spacing X of the pleat where the reinforcing member is located, hence the pleat spacing in FIG. 7B is "varying" or "variable. The spacing X is the same in FIGS. 7A and 7B. However, the spacing Y1 is less than the spacing Y2.

Although FIG. 7B depicts only a single pleat having a different spacing effectuated by the reinforcing member 32 having a width the same as shown in FIG. 7A, alternate and equivalent embodiments of a variable pleat spacing include having pleats across a filter, the spacing of which varies continuously from pleat to pleat or any other configuration as may be required by design or economy. By varying pleat frequency, a single media element can be expanded or contracted to fit different-sized filter media frames simply by increasing or decreasing pleat frequency.

While the preferred embodiments of the invention have been shown and described, it will be apparent to those skilled in the art that changes and modifications may be made therein without departing from the spirit of the invention, the scope of which is defined by the appended claims. For example, different materials, dimensions and methods of construction may be used.

What is claimed is:

1. An air filter, comprising:
    a filter media having a plurality of flat pleats defining a plurality of truncated pleat tips and sloping side surfaces along a front face and a rear face of the filter media, the truncated pleat tips oriented perpendicular to a direction of pleating and configured with a planar tip portion;
    a filter media reinforcing structure comprising:
    at least one generally planar first reinforcing strip oriented in the direction of pleating and connected to the truncated pleat tips along the rear face; and
    at least one generally planar second reinforcing strip oriented in the direction of pleating and connected to the truncated pleat tips along the front face.

2. The filter as recited in claim 1, wherein each first reinforcing strip is bonded to the planar tip portion of the truncated pleat tips along the rear face.

3. The filter as recited in claim 1, wherein each second reinforcing strip is bonded to the planar tip portion of the truncated pleat tips along the front face.

4. The filter as recited in claim 1, wherein the filter media is composed of low melt fibers.

5. The filter as recited in claim 1, wherein each planar tip portion is defined by a pair of offset score lines formed in the filter media as opposing longitudinal edges of the planar tip portion.

6. The filter as recited in claim 1, wherein the reinforcing structure further comprises at least one reinforcing member oriented perpendicular to the direction of pleating, each such reinforcing member having a first planar element extending along one sloping side surface of the rear face from a first edge to a second edge adjacent the rear face.

7. The filter as recited in claim 1, wherein an included angle between the planar tip portion and the sloping side surfaces is at least ninety degrees (90°).

8. The filter as recited in claim 1, wherein the filter is disposed within a frame.

9. The filter as recited in claim 8, wherein the frame has a configuration selected from the group consisting of having one, two or four frame members.

10. The filter as recited in claim 8, wherein any dimension between adjacent truncated pleat tips across the front or rear face is substantially equivalent.

11. The filter as recited in claim 8, wherein at least one dimension between adjacent truncated pleat tips across the front or rear face is different than remaining dimensions between adjacent truncated pleat tips.

12. The filter as recited in claim 8, wherein the frame includes a U-shaped frame member made up of a first frame member bounded by two corners and from which extends second and third frame members, the assembly of the first, second and third members forming the U-shaped frame member, each of the first, second and third frame members of which is formed from U-shaped channel; and a fourth frame member, removably attached at the extent of the second and third frame members to form the frame.

13. The filter as recited in claim 8, wherein the frame includes an L-shaped frame member comprised of a first frame member bounded by a first corner from which extends a second frame member, the first and second frame members forming the L-shaped frame member, each member of which is formed from U-shaped channel material; a third frame member, hingedly attached to the first frame member by a first hinge, opposite the first corner; a fourth frame member, hingedly attached to the second frame member by a second hinge, opposite the first corner.

14. The filter as recited in claim 8, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

15. The filter as recited in claim 14, wherein the first, second, third and fourth frame members are each comprised of U-shaped channel.

16. The filter as recited in claim 8, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

17. The filter as recited in claim 8, wherein the frame includes a cross-braced shaped frame member, said cross-braced frame member comprised of a rectangular frame reinforced by cross bracing.

18. The filter as recited in claim 8, wherein the frame includes an upper half frame; a lower half frame; a hinge, coupling the upper half frame to the lower half frame, said hinge allowing the upper and lower half frames to be opened and closed with respect to each other.

19. The filter as recited in claim 18, wherein at least one of said upper and lower half frames includes cross bracing.

20. The filter as recited in claim 5, wherein the offset score lines of the truncated pleat tips along the front face are separated a first distance and the offset score lines of the truncated pleat tips along the rear face are separated a second distance.

21. The filter as recited in claim 20, wherein the first distance is greater than the second distance.

22. The filter as recited in claim 20, wherein the first distance is substantially equivalent to the second distance.

23. The filter as recited in claim 21, wherein the second distance is approximately 0.03125 inches.

24. The filter as recited in claim 22, wherein the second distance is approximately 0.03125 inches.

25. An air filter, comprising:
a filter media having a plurality of flat pleats defining a plurality of truncated pleat tips and sloping side surfaces along a front face and a rear face, the truncated pleat tips oriented perpendicular to the direction of pleating and configured with a planar tip portion;
a filter media reinforcing structure comprising:
at least one reinforcing member oriented perpendicular to the direction of pleating, each such reinforcing member having a first planar element extending along one sloping side surface of the rear face from a first edge to a second edge adjacent the rear face; and
at least one generally planar first reinforcing strip oriented in the direction of pleating and connected to the truncated pleat tips along the rear face and the reinforcing member.

26. The filter as recited in claim 25, wherein each first planar reinforcing strip is bonded to the planar tip portion of the truncated pleat tips along the rear face.

27. The filter as recited in claim 25, wherein each reinforcing member further includes a second planar element extending from the second edge to a third edge between adjacent truncated pleat tips.

28. The filter as recited in claim 26, wherein each reinforcing member further includes a third planar element extending from the third edge to a fourth edge, such that the fourth edge is contiguous with the first planar element between the first and second edges.

29. The filter as recited in claim 28, wherein the fourth edge is connected to the first planar element to bisect the first planar element.

30. The filter as recited in claim 28, wherein the fourth edge bonded to the first planar element.

31. The filter as recited in claim 28, wherein each reinforcing member further includes a fourth planar element extending from the fourth edge to a fifth edge so that the fourth planar element is contiguous and parallel with a portion of the first planar element and the fifth edge is disposed adjacent the first edge.

32. The filter as recited in claim 31, wherein the fourth planar element is connected to the portion of the first planar element.

33. The filter as recited in claim 31, wherein the fourth planar element is bonded to the portion of the first planar element.

34. The filter as recited in claim 25, wherein the filter media is composed of low melt fibers.

35. The filter as recited in claim 25, wherein an included angle between the planar tip portion and the sloping side surfaces is at least ninety degrees (90°).

36. The filter as recited in claim 25, wherein the filter media is disposed within a frame.

37. The filter as recited in claim 36, wherein the frame has a configuration selected from the group consisting of having one, two or four frame members.

38. The filter as recited in claim 36, wherein the frame includes a U-shaped frame member made up of a first frame member bounded by two corners and from which extends second and third frame members, the assembly of the first, second and third members forming the U-shaped frame member, each of the first, second and third frame members of which is formed from U-shaped channel; and a fourth frame member, removably attached at the extent of the second and third frame members to form the frame.

39. The filter as recited in claim 36, wherein the frame includes an L-shaped frame member comprised of a first frame member bounded by a first corner from which extends a second frame member, the first and second frame members forming the L-shaped frame member, each member of which is formed from U-shaped channel material; a third frame member, hingedly attached to the first frame member by a first hinge, opposite the first corner; a fourth frame member, hingedly attached to the second frame member by a second hinge, opposite the first corner.

40. The filter as recited in claim 36, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

41. The filter as recited in claim 40, wherein the first, second, third and fourth frame members are each comprised of U-shaped channel.

42. The filter as recited in claim 36, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

43. The filter as recited in claim 36, wherein the frame includes a cross-braced shaped frame member, said cross-braced frame member comprised of a rectangular frame reinforced by cross bracing.

44. The filter as recited in claim 36, wherein the frame includes an upper half frame; a lower half frame; a hinge, coupling the upper half frame to the lower half frame, said hinge allowing the upper and lower half frames to be opened and closed with respect to each other.

45. The filter as recited in claim 44, wherein at least one of said upper and lower half frames includes cross bracing.

46. The filter as recited in claim 36, wherein any dimension between adjacent truncated pleat tips across the front or rear face is substantially equivalent.

47. The filter as recited in claim 36, wherein at least one dimension between adjacent truncated pleat tips across the front or rear face is different than remaining dimensions between adjacent truncated pleat tips.

48. The filter as recited in claim 25, wherein each planar tip portion is defined by a pair of offset score lines formed in the filter media as opposing longitudinal edges of the planar tip portion.

49. The filter as recited in claim 48, wherein the offset score lines of the truncated pleat tips along the front face are separated a first distance and the offset score lines of the truncated pleat tips along the rear face are separated a second distance.

50. The filter as recited in claim 49, wherein the first distance is greater than the second distance.

51. The filter as recited in claim 49, wherein the first distance is substantially equivalent to the second distance.

52. The filter as recited in claim 50, wherein the second distance is at least approximately 0.03125 inches.

53. The filter as recited in claim 50, wherein the second distance is at least approximately 0.03125 inches.

54. The filter as recited in claim 25, wherein the truncated pleat tips are configured with a variable frequency.

55. The filter as recited in claim 54, wherein the variable frequency includes a first frequency and a second frequency.

56. An air filter, comprising:
a filter media having a plurality of flat pleats defining a plurality of truncated pleat tips and sloping side surfaces along a front face and a rear face, the truncated pleat tips oriented perpendicular to the direction of pleating and configured with a planar tip portion defined by a pair of offset score lines formed in the filter media as opposing longitudinal edges of the planar tip portion;
a filter media reinforcing structure comprising:
at least one reinforcing member oriented perpendicular to the direction of pleating, each such reinforcing member having a first planar element extending along one sloping side surface of the rear face from a first edge to a second edge adjacent the rear face;
at least one generally planar first reinforcing strip oriented in the direction of pleating and connected to the planar tip portions along the rear face and each reinforcing member; and
at least one generally planar second reinforcing strip oriented in the direction of pleating and connected to the planar tip portions along the front face.

57. The filter as recited in claim 56 wherein each reinforcing member further includes a second planar element extending from the second edge to a third edge between adjacent truncated pleat tips.

58. The filter as recited in claim 57, wherein each reinforcing member further includes a third planar element extending from the third edge to a fourth edge, the fourth edge contiguous with the first planar element between the first and second edges.

59. The filter as recited in claim 58, wherein the fourth edge is connected to the first planar element to bisect the first planar element.

60. The filter as recited in claim 58, wherein the fourth edge bonded to the first planar element.

61. The filter as recited in claim 58, wherein each reinforcing member further includes a fourth planar element extending from the fourth edge to a fifth edge so that the fourth planar element is contiguous and parallel with a portion of the first planar element and the fifth edge is disposed adjacent the first edge.

62. The filter as recited in claim 61, wherein the fourth planar element is connected to the portion of the first planar element.

63. The filter as recited in claim 61, wherein the fourth planar element is bonded to the portion of the first planar element.

64. The filter as recited in claim 61, wherein each first reinforcing strip is bonded to the planar tip portion of the truncated pleat tips along the rear face.

65. The filter as recited in claim 56, wherein each second reinforcing strip is bonded to the planar tip portion of the truncated pleat tips along the front face.

66. The filter as recited in claim 56, wherein the filter media is composed of low melt fibers.

67. The filter as recited in claim 56, wherein an included angle between the planar tip portion and the sloping side surfaces is at least ninety degrees (90°).

68. The filter as recited in claim 56, wherein the filter is disposed within a frame.

69. The filter as recited in claim 68, wherein the frame includes a U-shaped frame member made up of a first frame member bounded by two corners and from which extends second and third frame members, the assembly of the first, second and third members forming the U-shaped frame member, each of the first, second and third frame members of which is formed from U-shaped channel; and a fourth frame member, removably attached at the extent of the second and third frame members to form the frame.

70. The filter as recited in claim 68, wherein the frame includes an L-shaped frame member comprised of a first frame member bounded by a first corner from which extends a second frame member, the first and second frame members forming the L-shaped frame member, each member of which is formed from U-shaped channel material; a third frame member, hingedly attached to the first frame member by a first hinge, opposite the first corner; a fourth frame member, hingedly attached to the second frame member by a second hinge, opposite the first corner.

71. The filter as recited in claim 68, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

72. The filter as recited in claim 71, wherein the first, second, third and fourth frame members are each comprised of U-shaped channel.

73. The filter as recited in claim 68, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

74. The filter as recited in claim 68, wherein the frame includes a cross-braced shaped frame member, said cross-braced frame member comprised of a rectangular frame reinforced by cross bracing.

75. The filter as recited in claim 68, wherein the frame includes an upper half frame; a lower half frame; a hinge, coupling the upper half frame to the lower half frame, said hinge allowing the upper and lower half frames to be opened and closed with respect to each other.

76. The filter as recited in claim 75, wherein at least one of said upper and lower half frames includes cross bracing.

77. The filter as recited in claim 68, wherein the frame has a configuration selected from the group consisting of having one, two or four s.

78. The filter as recited in claim 68, wherein any dimension between adjacent truncated pleat tips across the front or rear face is substantially equivalent.

79. The filter as recited in claim 68, wherein at least one dimension between adjacent truncated pleat tips is different than remaining dimensions between adjacent truncated pleat tips.

80. The filter as recited in claim 60, wherein the offset score lines of the truncated pleat tips along the front face are separated a first distance and the offset score lines of the truncated pleat tips along the rear face are separated a second distance.

81. The filter as recited in claim 80, wherein the first distance is greater than the second distance.

82. The filter as recited in claim 80, wherein the first distance is substantially equivalent to the second distance.

83. The filter as recited in claim 80, wherein the second distance is at least approximately 0.03125 inches.

84. The filter as recited in claim 80, wherein the second distance is at least approximately 0.03125 inches.

85. The filter as recited in claim 66, wherein the truncated pleat tips are configured with a variable frequency.

86. The filter as recited in claim 85, wherein the variable frequency includes a first frequency and a second frequency.

87. An air filter, comprising:
a filter media having a plurality of flat pleats defining a plurality of truncated pleat tips and sloping side surfaces along a front face and a rear face, the truncated pleat tips oriented perpendicular to the direction of pleating and configured with a planar tip portion;
a filter media frame comprising:
at least one reinforcing member oriented perpendicular to the direction of pleating, each such reinforcing member having a first planar element extending along one sloping side surface of the front face from a first edge to a second edge adjacent the front face;
at least one generally planar first reinforcing strip oriented in the direction of pleating and connected to the planar tip portions along the rear face; and
at least one generally planar second reinforcing strip oriented in the direction of pleating and connected to the planar tip portions along the front face and each reinforcing member.

88. The filter as recited in claim 87, wherein each reinforcing member further includes a second planar element extending from the second edge to a third edge between adjacent truncated pleat tips.

89. The filter as recited in claim 88, wherein each reinforcing member further includes a third planar element extending from the third edge to a fourth edge, the fourth edge contiguous with the first planar element between the first and second edges.

90. The filter as recited in claim 89, wherein the fourth edge is connected to the first planar element to bisect the first planar element.

91. The filter as recited in claim 89, wherein the fourth edge bonded to the first planar element.

92. The filter as recited in claim 89, wherein each reinforcing member further includes a fourth planar element extending from the fourth edge to a fifth edge so that the fourth planar element is contiguous and parallel with a portion of the first planar element and the fifth edge is disposed adjacent the first edge.

93. The filter as recited in claim 92, wherein the fourth planar element is connected to the portion of the first planar element.

94. The filter as recited in claim 92, wherein the fourth planar element is bonded to the portion of the first planar element.

95. The filter as recited in claim 87, wherein each first reinforcing strip is bonded to the planar tip portion of the truncated pleat tips along the rear face.

96. The filter as recited in claim 87, wherein each second reinforcing strip is bonded to the planar tip portion of the truncated pleat tips along the front face and each reinforcing member.

97. The filter as recited in claim 87, wherein the filter media is composed of low melt fibers.

98. The filter as recited in claim 87, wherein an included angle between the planar tip portion and the sloping side surfaces is at least ninety degrees (90°).

99. The filter as recited in claim 87, wherein the filter is disposed within a frame.

100. The filter as recited in claim 99, wherein the frame includes a U-shaped frame member made up of a first frame member bounded by two corners and from which extends second and third frame members, the assembly of the first, second and third members forming the U-shaped frame member, each of the first, second and third frame members of which is formed from U-shaped channel; and a fourth frame member, removably attached at the extent of the second and third frame members to form the frame.

101. The filter as recited in claim 99, wherein the frame includes an L-shaped frame member comprised of a first frame member bounded by a first corner from which extends a second frame member, the first and second frame members forming the L-shaped frame member, each member of which is formed from U-shaped channel material; a third frame member, hingedly attached to the first frame member by a first hinge, opposite the first corner; a fourth frame member, hingedly attached to the second frame member by a second hinge, opposite the first corner.

102. The filter as recited in claim 99, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

103. The filter as recited in claim 102, wherein the first, second, third and fourth frame members are each comprised of U-shaped channel.

104. The filter as recited in claim 99, wherein the frame includes an L-shaped frame member comprised of a first frame member bounded by a first corner and from which extends a second frame member, the first and second frame members forming the L-shaped frame member; a third frame member, hingedly attached to the first frame member by a first hinge opposite the first corner; and a fourth frame member, hingedly attached to the second frame member by a second hinge, opposite the first corner; whereby the first and second hinges allow the first and second frame members to open and close such that the first, second, third and fourth frame members form the frame in a closed position.

105. The filter as recited in claim 99, wherein the frame includes a cross-braced shaped frame member, said cross-braced frame member comprised of a rectangular frame reinforced by cross bracing.

106. The filter as recited in claim 99, wherein the frame includes an upper half frame; a lower half frame; a hinge, coupling the upper half frame to the lower half frame, said hinge allowing the upper and lower half frames to be opened and closed with respect to each other.

107. The filter as recited in claim 106, wherein at least one of said upper and lower half frames includes cross bracing.

108. The filter as recited in claim 99, wherein the frame has a configuration selected from the group consisting of having one, two or four frame sections.

109. The filter as recited in claim 99, wherein any dimension between adjacent truncated pleat tips across the front or rear face is substantially equivalent.

110. The filter as recited in claim 99, wherein at least one dimension between adjacent truncated pleat tips is different than remaining dimensions between adjacent truncated pleat tips.

111. The filter as recited in claim 110, wherein each planar tip portion is defined by a pair of offset score lines formed in the filter media as opposing longitudinal edges of the planar tip portion.

112. The filter as recited in claim 111, wherein the offset score lines of the truncated pleat tips along the front face are separated a first distance and the offset score lines of the truncated pleat tips along the rear face are separated a second distance.

113. The filter as recited in claim 94, wherein the first distance is greater than the second distance.

114. The filter as recited in claim 113, wherein the first distance is substantially equivalent to the second distance.

115. The filter as recited in claim 113, wherein the second distance is at least approximately 0.03125 inches.

116. The filter as recited in claim 113, wherein the second distance is at least approximately 0.03125 inches.

117. The filter as recited in claim 94, wherein the truncated pleat tips are configured with a variable frequency.

118. The filter as recited in claim 117, wherein the variable frequency includes a first frequency and a second frequency.

* * * * *